United States Patent
Matthies

(10) Patent No.: US 7,434,867 B2
(45) Date of Patent: Oct. 14, 2008

(54) SEALING STRIP FOR THE FRAME STRUCTURE OF A VEHICLE

(75) Inventor: Ingolf Matthies, Altenau (DE)

(73) Assignee: Meteor Gummiwerke K.H. Badje GmbH & Co., Bockenem (DE)

( * ) Notice: Subject to any disclaimer, the term of this patent is extended or adjusted under 35 U.S.C. 154(b) by 566 days.

(21) Appl. No.: 10/541,170

(22) PCT Filed: Feb. 11, 2004

(86) PCT No.: PCT/EP2004/001250

§ 371 (c)(1),
(2), (4) Date: Jun. 30, 2005

(87) PCT Pub. No.: WO2004/082975

PCT Pub. Date: Sep. 30, 2004

(65) Prior Publication Data

US 2007/0094933 A1 May 3, 2007

(30) Foreign Application Priority Data

Mar. 18, 2003 (DE) .............................. 203 04 269 U

(51) Int. Cl.
*B60J 10/02* (2006.01)
(52) U.S. Cl. ................... 296/146.9; 49/482.1; 49/484.1
(58) Field of Classification Search ............. 296/146.2, 296/146.9, 107.04, 135, 107.07; 49/496.1, 49/440, 441, 428, 482.1, 484.1, 502
See application file for complete search history.

(56) References Cited

U.S. PATENT DOCUMENTS 4,447,989 A * 5/1984 Mailand et al. ............. 49/482.1
6,213,536 B1 4/2001 Raisch et al. ............ 296/146.9
6,260,906 B1 7/2001 Buchholtz ................ 296/146.9
6,439,641 B1 8/2002 Anders et al. ............ 296/107.4
7,052,021 B2 * 5/2006 Plottnik ...................... 277/642
2004/0049989 A1 * 3/2004 Florentin et al. .............. 49/502

FOREIGN PATENT DOCUMENTS

| DE | 195 31 600 | 3/1997 |
|---|---|---|
| DE | 198 01 870 C2 | 1/1998 |
| DE | 298 12 428 U1 | 7/1998 |
| DE | 299 16 383 U1 | 9/1999 |
| EP | 0 524 447 A1 | 1/1993 |
| FR | 2743028 | 7/1997 |
| GB | 373477 | 5/1932 |
| WO | WO 00/03885 | 1/2000 |

* cited by examiner

*Primary Examiner*—Dennis H Pedder
(74) *Attorney, Agent, or Firm*—Fox Rothschild, LLP; Gary A. Hecht

(57) ABSTRACT

A U-shaped sealing strip arranged for mounting on a frame structure of a vehicle surrounds a space which is intended to receive a pane and which has a lengthwise changing depth dimension. The U-shaped structure comprises two L-shaped shaped parts of which at least one has a generally L-shaped configuration and comprises a base part intended for fixing on the frame structure and a side part extending perpendicular thereto. At least one of the two shaped parts is adjustably fixed on the frame structure for adjustment in a direction perpendicular to the surface of the pane in such a way that the contact pressure of the sealing lip is adjustable. The contact pressure of the sealing lips on the pane can be adjusted in a simple manner in accordance with specific requirements in order to secure a reliable sealing effect as well as to reduce wear.

25 Claims, 4 Drawing Sheets

SEALING STRIP FOR THE FRAME STRUCTURE OF A VEHICLE

FIELD OF THE INVENTION

The invention relates to a sealing strip which is arranged for mounting on a frame structure of a vehicle and intended for cooperation with a window pane.

BACKGROUND OF THE INVENTION

Such sealing strips are intended to co-operate with the movable pane of the window opening of a vehicle, which pane can move between an open and a closed position. They are used in the region of the C-columns, but also the roof frame of folding roof covers, hardtops and retractable hardtops. The sealing elements come more or less into sealing abutment with the edge regions of the pane depending upon the state of opening of the pane.

As a rule the sealing elements are constructed in such a way that sealing lips are provided on both sides of the pane and butt with a defined prestressing against the pane. This prestressing is designed so that sufficient sealing force is provided but the unavoidable wear is kept within limits.

In the design of the pivoting movement of the pane between the open and the closed position, limiting conditions must be heeded which are contingent upon the configuration of the space available within the door construction. This is often restricted by the wheel cases, so that simple vertical movement of the pane is frequently impossible and a pivoting movement therefore must be arranged which is adapted to these spatial restrictions. This situation must also be taken into account in the design of the sealing strip, namely with the object of ensuring that the sealing lips uniformly cover the pane on both sides as a function of the state of opening of the pane along the pivot curve which is fixed by the design.

A further limiting condition for the sealing strip results from the spatial curvature of the window boundary defined by the respective vehicle.

In the applicants' firm integral sealing strips are known which exhibit a generally U-shaped construction in cross-section and can be fixed on the frame structure of a vehicle, in this case a window enclosure, by way of a central base section. These sealing strips arrive at the vehicle assembly line in this form, that is to say as a finished product. Because of the aforementioned pivot curve which has to be arranged for the pane, this space—when viewed along the sealing strip—has different depth dimensions so that because of the poor accessibility it is frequently very difficult to carry out subsequent work on functional surfaces which are usually disposed within this space. In individual cases this can lead to reductions in quality and even to defects in the end products.

From the located document WO 00/03885 A a sealing strip is known which is arranged for mounting on a frame structure of a vehicle, is intended for co-operation with a pivotable pane of a window and forms a space which is generally U-shaped and arranged to receive the pane. The free ends of the cross-sectional structure are each provided with a sealing lip which is intended for sealing abutment on the edge. The said cross-sectional structure is composed of two L-shaped parts, the base parts of which overlap and the side parts of which form the lateral boundaries of the cross-section. The base parts are fixed relative to one another by positive locking, and at the same time are firmly fixed to the frame structure of the vehicle by screwing.

From the located document FR 2 743 028 A a comparable sealing strip is known which has a U-shaped cross-section and is generally composed of two L-shaped frame parts which are made from thermoplastic plastics material and jointly bear a sealing element which on its free ends forms sealing lips which are intended for lateral abutment on the pane of the doors of a motor vehicle. By way of a central intermediate portion in the form of a membrane the sealing element connects the base portions of the frame parts, wherein this intermediate portion is dimensioned in such a way that the frame parts are spaced from one another in the unmounted state of the sealing strip. However, the installed state of this sealing strip is characterised in that the two frame parts are firmly connected to one another by way of their base portions which are of complementary construction in the manner of a tongue-and-groove joint, so that the membrane-like connecting portion arches into the interior of the U-shaped cross-section and forms a resilient abutment strip for a pane introduced into this space.

The sealing strip which is known from the located document DE 195 31 600 A1 is characterised by an integral U-shaped rail, the free ends of which are connected to sealing lips which protrude into the U-shaped cross-sectional space and are intended for sealing abutment on the pane of the doors of a motor vehicle. The said rail is fixed by screwing of one of the two flanks to a flange-like frame structure of the vehicle, the screw connection being designed in such a way that adjustment in the vertical and longitudinal direction of the vehicle is possible.

All of these known sealing strips are characterised in that the dimensions of the U-shaped receiving structure for the pane are in fact predetermined by the design and are not adjustable. This means that accordingly the contact pressure of the sealing elements or of the sealing lips is likewise determined by the dimensions, the shape and the material. In the case of these designs, if the resulting contact force is inadequate or irregular there are no corrective measures available which can be carried out simply in terms of cost.

One requirement for variation of the contact pressure results from the predicted future use of vehicle wash installations in which brush arrangements which move in a rotary or linear fashion are omitted and instead of these systems nozzle arrangements are used from which a cleaning fluid emerges under high pressure. In individual cases sealing arrangements in the window region have proved unsatisfactory in order to withstand the pressure of the impacting cleaning fluid.

SUMMARY OF THE INVENTION

The object of the invention is to design a sealing strip of the generic type described above with a view to a qualitatively uniform and reproducibly good end product and also with a view to subsequent changes to the setting. This object is achieved in such a sealing strip by using shaped parts that, in the mounted state, are connected only via the frame structure but are not connected directly to one another, wherein at least one of the two shaped parts has a sealing lip and is adjustably fixed on the frame structure for adjustment in a direction perpendicular to the surface of the pane in such a way that the contact pressure of the sealing lip against the pane is adjustable.

First of all it is essential to the invention that the two shaped parts which surround the space of U-shaped cross-section in the sealing strip are in the form of components which are separate from one another and thus arrive at the vehicle assembly line in this separated state. Thus operations which occur after the shaping of the shaped parts can be carried out unhindered by the shape of the sealing strip, so that the production problems which are associated with the restricted accessibility of working surfaces within the said space and its changing depth—when viewed along the sealing strip—do not even occur at all. Thus both shaped parts can be processed separately from one another until the end product stage is reached. This opens up advantageous possibilities for the provision of a reproducible product quality.

It is also an essential feature of the invention that at least one of the two shaped parts—when viewed in a direction perpendicular to the surface of the pane—is adjustably fixed on the frame structure or a window enclosure. This means that the contact pressure with which the sealing lips are applied to the pane can be varied by adaptation of the position of at least one of the shaped parts. In this way an irregular contact pressure, irrespective of its cause, on both sides of the pane can be changed or compensated for in a desired manner. Furthermore, in so far as this can be combined with a limitation of the wear and also in circumstances in which it is difficult to operate the opening and closing process of the pane an increased contact pressure can be set so that problems with high-pressure car wash installations are reliably avoided.

At least one of the shaped parts is provided with a functional surface, and processing of functional surfaces, e.g. sealing surfaces, can comprise the application of coatings for example in the form of antifriction varnish, fibre coverings, etc.

The sealing strip has a spatially curved configuration, wherein the depth dimension of the space with a U-shaped cross-section changes from one end to the other. The spatial curvature as well as the type of change of the said depth dimension are determined by the design data of the respective vehicle.

The features of the sealing strip are simple to implement. At least the shaped part which is disposed so as to be adjustable perpendicular to the pane has an L-shaped cross-section comprises a base part and a side part, wherein the former is arranged for fixing on the frame structure. The side part extends substantially parallel to the pane or to the depth dimension. The shaped parts are mounted independently of one another on the frame structure and are not directly connected to one another in any case.

The invention encompasses various embodiments of the sealing strip in terms of design and materials. In one embodiment, the base part extends substantially parallel to an edge portion of the frame structure and is adjustably connected to the edge portion perpendicular to the surface of the pane. Accordingly the sealing strip is connected to the frame structure with the proviso that the space delimited by the sealing strip is in any case reliably sealed and protected relative to the outer space. This is effected by positioning at least one sealing profile between the frame structure and one of the shaped parts for sealing the interior of the sealing strip relative to an outer face of the frame structure. Accordingly the shaped parts can be made from a plastics material (e.g. PPE), a metal, e.g. high-alloy steel sheet, or in one case from plastics material and in the other case from a metal. Depending upon the dimensions and the structure of the shaped parts an improvement in stability may be expected in the case where the part is made from plastics material over an arrangement of reinforcing ribs.

Due to the releasable fixing of the shaped parts on the frame structure subsequent interventions are also possible, in particular readjustments of the sealing lips.

The shaped parts are constructed so that they are spatially curved in a manner which is dependent upon the respective vehicle.

BRIEF DESCRIPTION OF THE DRAWINGS

The invention is explained in greater detail below with reference to the embodiment of a sealing strip which is illustrated in the attached drawings, in which.

DETAILED DESCRIPTION OF THE EMBODIMENTS

Figure 1:
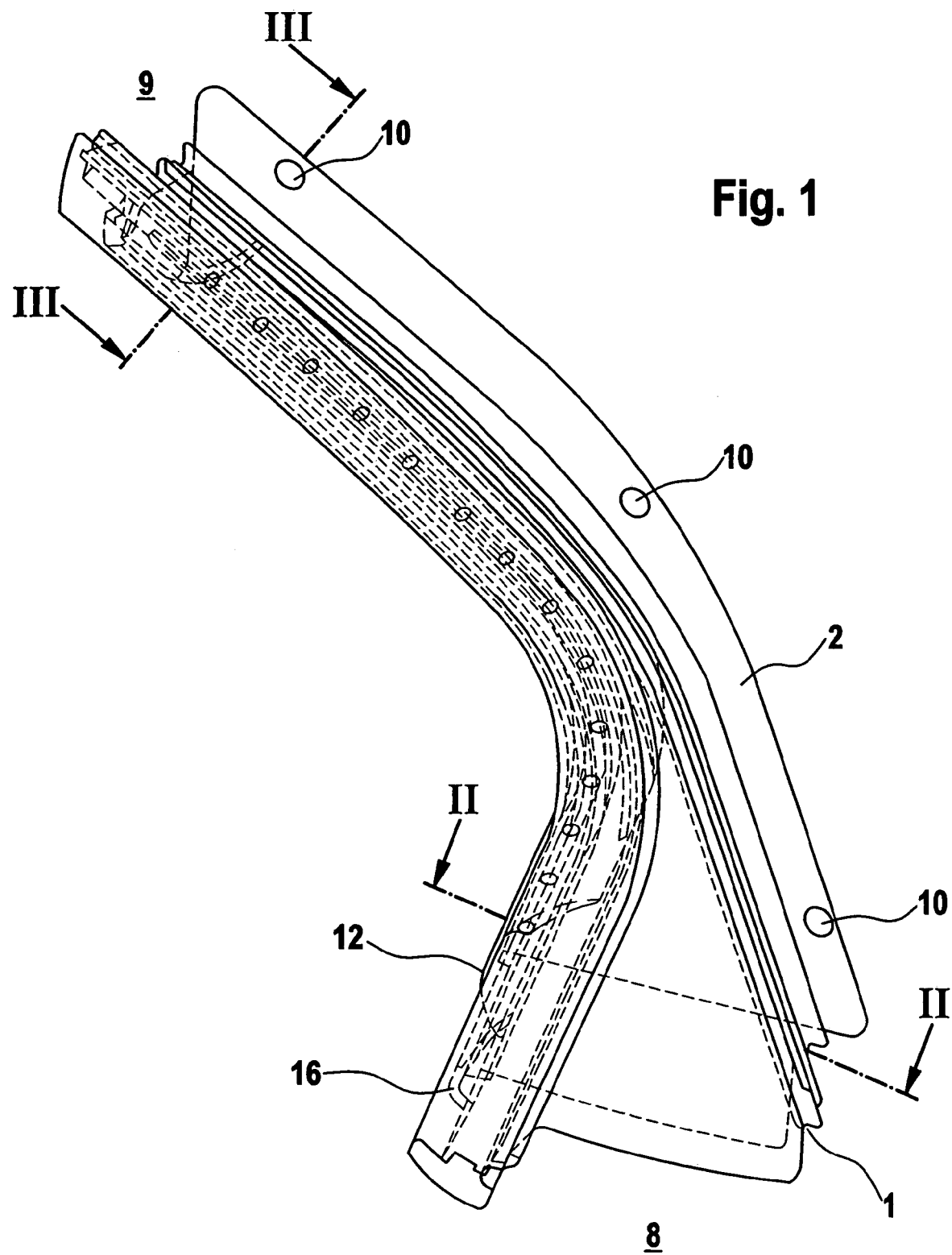
FIG. 1 shows a perspective view of a sealing strip according to the invention.

Two shaped parts which are intended for fixing on a frame structure 3 of the window enclosure of a motor vehicle, in this case in the region of the C-column, are denoted by 1, 2. Both parts are releasably connected to the frame structure and in conjunction with the first one delimit a space 4 with a generally U-shaped cross-section.

The shaped parts 1, 2 are made from a plastics material, e.g. a glass fibre-reinforced PPE (polyphenylene oxide) with a fibre content of for example 20%. However, other plastics materials may also be considered so long as they provide a comparable strength with comparable mass. One of the shaped parts or both shaped parts can also be made from a metal material, e.g. high-alloy steel sheet.

The frame structure 3 which is of double-walled construction and comprises an inner wall 3' and an outer wall 3" delimits a window cut-out 5, wherein the inner wall 3' has an edge portion 6 which extends perpendicular to the planes of these walls and at its end facing the outer wall 3" is connected thereto for example by folding. The frame structure 3 is closed relative to the window cut-out 5 by the edge portion 6.

As can be seen from FIG. 1, the depth of the space 4 increases continuously with a depth dimension 7 from one end 8 to the other end 9 of the sealing strip. This depth dimension 7 describes the extent of the shaped part 1, 2 in each case perpendicular to the edge portion 6.

Figure 4:
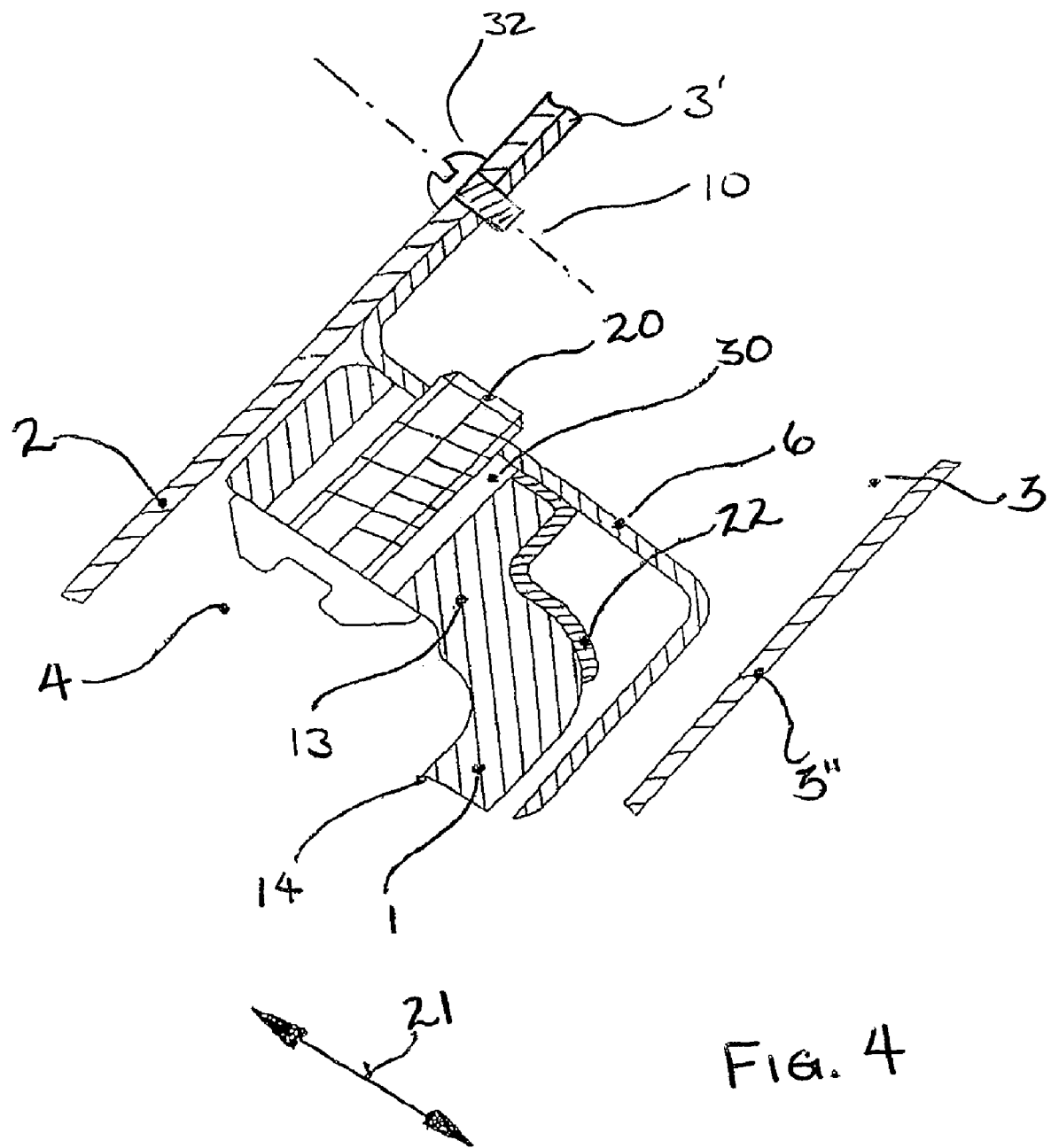
FIG. 4 shows a portion of FIG. 2 on an enlarged scale.

The inner shaped part 2 is constructed as a flat web which extends parallel to the inner wall 3' and is held thereon, for example by screw 32, as indicated at the location 10 and shown FIG. 4. On its end remote from the edge portion 6 it bears a sealing element 11 on which a sealing lip 12 is formed which extends into the space 4. The lip 12' which can also be seen in the drawing and protrudes into the interior of the vehicle serves principally for decorative purposes.

The outer shaped part 1 has a generally L-shaped contour and comprises a base part 13 which is intended for fixing on the edge portion 6 and extends substantially parallel thereto and a side part 14 which extends substantially perpendicular to the base part 13. Moreover, the side part 14 extends parallel to the outer wall 3" of the frame structure 3. The shaped part 1 bears on its end remote from the edge portion 6 a sealing element 15 on which in turn a sealing lip 16 is formed which extends into the said space 4.

Both sealing lips 12, 16 extend towards one another within the space and are intended to butt against a pane 17 on both sides thereof with a defined contact pressure and thus fulfil a sealing function. The pane 17 extends parallel to the shaped part 2 as well as the side part 14 of the shaped part 1 in a central region of the space 4. It penetrates more or less deeply into this space 4 as a function of an opening or closing movement, as is indicated by the dash-dot representation of the pane.

The sealing elements 11, 15 are made as a whole from an elastomer, e.g. EPDM (ethylene propylene diene elastomer) or also TPE (thermoplastic elastomer). They are produced for example by moulding around the ends of the shaped parts 1, 2 using a shaping tool, the portions of the shaped parts to be moulded around being previously coated with SBR (styrene butadiene elastomer).

The base part 13 is characterised by two supporting ribs 18, 19 which are spaced from one another and extend parallel to one another in the longitudinal direction of the sealing strip and between which are located fixing screws 20—which are spaced from one another in the longitudinal direction of the sealing strip. These fixing screws 20 each pass through holes in the base part 13 as well as the edge portion 6 and serve for fixing the shaped part 1 on the frame structure 3. It will be recognised that by varying the position of the hole which is intended to receive a fixing screw 20 in the base part 13 the position of the shaped part 1 can be changed in a simple manner perpendicular to the plane of the pane 17 or to the shaped part 2 and thus in the direction of the arrows 21. In practice the adaptability serves for the orientation of the position of the shaped part 1 relative to the frame structure 3. The mechanical pretension under which the sealing lips butt against the pane 17 can be adjusted by variation of the shaped part 2 in the direction of the arrows 21, for example by washers which co-operate with the screws at the location 10.

For example, as shown in FIG. 4, for implementation by design of a possibility for adjustment of the shaped part 1 the hole in the base part 13 intended to receive the fixing screw 20 can be an elongate slot 30, the cross-section of which extends in the direction of the arrows 21.

The part of the supporting rib 19 intended to butt against the edge portion 6 is covered by a sealing profile 22 made from an elastomer such as for example EPDM.

On the end of the shaped part 1 facing the sealing element 15 there is a strip 23 which projects towards the outer face 24 and has a uniform width—when viewed in the longitudinal direction of the sealing strip. The outer face of the strip 23 extends approximately flush with the outer wall 3". The strip 23 is connected to the facing side of the frame structure 3, in this case to the connection point between the inner wall 3' and the outer wall 3", with the interposition of a projection 25 which is covered with a sealing profile 26 made from an elastomer.

Figure 2:
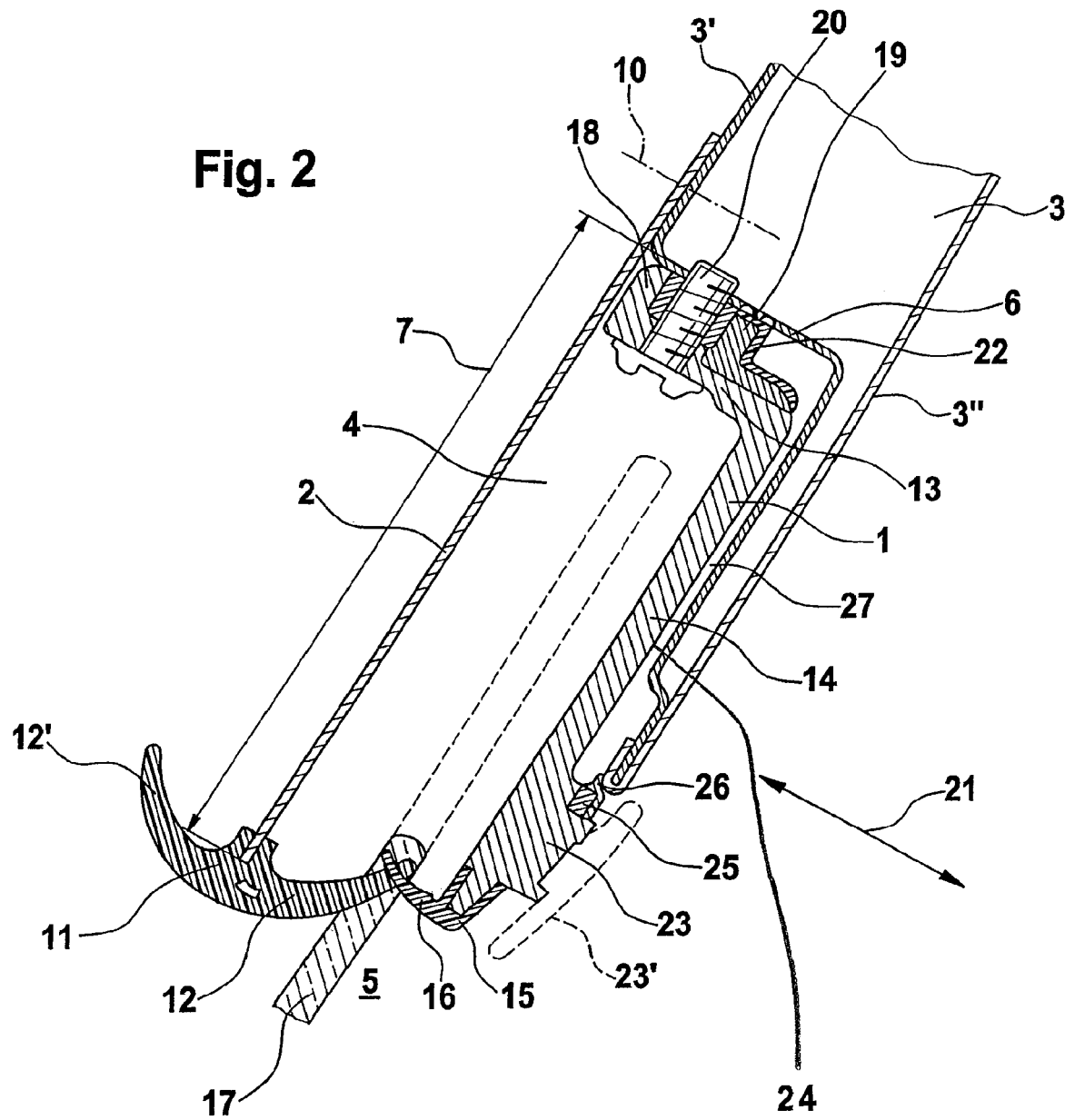
FIG. 2 shows a sectional view of the sealing strip in a plane II-II in FIG. 1.
Figure 3:
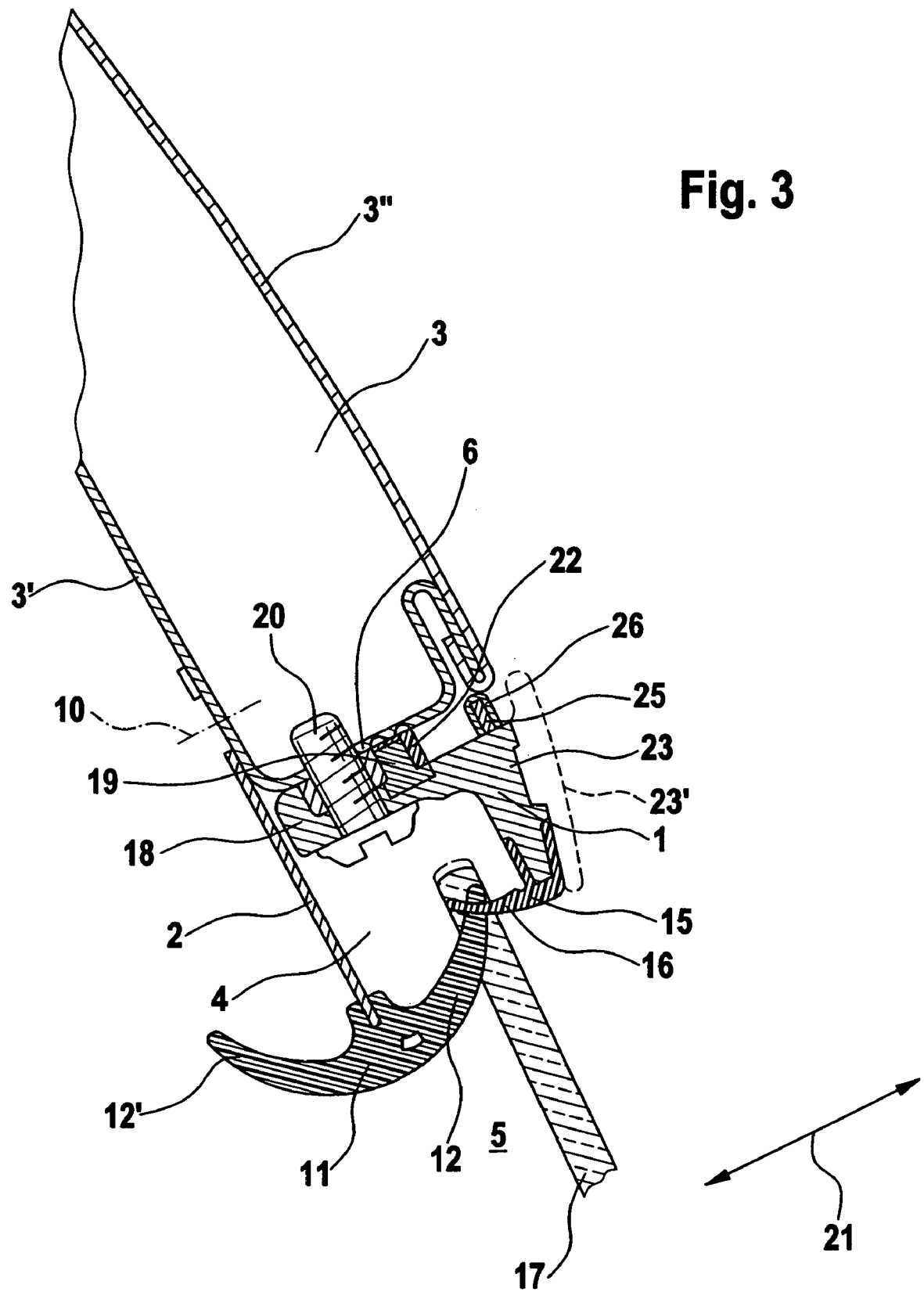
FIG. 3 shows a sectional view of the sealing strip in a plane III-III in FIG. 1.

The strip 23 formed integrally with the side part 14 is applied as a support for an ornamental strip 23' which is shown by dotted lines in FIGS. 2 and 3 of the drawings. Towards the outside it forms the closure of the outer wall 3" which in the illustrated embodiment covers the sealing strip on the outside so that externally a smooth aesthetic appearance of the outer wall 3" up to the sealing element 15 is produced. As an alternative to this, however, the strip 23 and thus the shaped part 1 can also be constructed in such a way that a comparable external aesthetic appearance is produced.

Both sealing profiles 22, 26 can be produced in the same way as the said sealing elements 11, 15 by moulding around corresponding structural elements of the shaped parts 1, 2 in conjunction with a shaping tool, whereby in turn the portions to be moulded round are previously coated with SBR.

Due to the two sealing profiles 22, 26 the space 27 defined between the outer face of the side part 14 on the one hand and the inner face of the frame structure on the other hand and thus the interior of the sealing strip is reliably sealed relative to the outer face 24.

The shaped parts 1, 2 equipped with the respective sealing elements 11, 16 arrive individually for assembly on a frame structure 3 and thus it is only in the assembled state that they form a sealing strip which is capable of functioning. Irrespective of the depth of the U-shaped space 4 the shaped parts 1, 2 can be subjected to final processing which for example comprises the application of surface coatings at least to the portions of the sealing lips 12, 16 which interact with the pane. An application of antifriction varnish, a fibre covering etc. may be mentioned merely by way of example. This subsequent processing can be carried out without hindrance.

During assembly of the two shaped parts 1, 2 the contact pressure of the sealing lips on the pane 17 and thus the sealing effect can be varied by readjustment of the position of the shaped part 1 in the direction of the arrows 21. According to the invention this is possible particularly simply since the fixing screw 21 is easily accessible and this adjustment work can be carried out without great outlay. In practice, however, a compromise must always be arrived at between the greatest possible sealing effect on the one hand and still acceptable wear on the other hand.

With the aid of the foregoing statements it will be recognised that the design of the sealing strip according to the invention brings with it advantages in terms of production and moreover a high degree of flexibility in the possibility which is available at any time of readjustment of the contact pressure of the sealing lip on the pane.

The invention claimed is:

1. A sealing strip mountable on a frame structure of a vehicle for sealing a window pane movable between an open and a closed position, said strip comprising:

first and second shaped parts, each mounted independently of one another on said frame structure, said shaped parts being in spaced relation and delimiting a space with a generally U-shaped cross-section therebetween for receiving said window pane in said closed position;

at least one sealing lip mounted on one of said first and second shaped parts and positioned to contact said window pane when in said closed position with a predetermined contact pressure; and wherein at least one of said first and second shaped parts on which said sealing lip is mounted is adjustably positioned relative to said frame structure, said one shaped part being movable relative to said frame structure in a direction substantially perpendicular to said window pane so as to control said contact pressure between said sealing lip and said window pane.

2. A sealing strip according to claim 1, further comprising a functional surface positioned on one of said first and second shaped parts, said functional surface having a coating thereon.

3. A sealing strip according to claim 1, wherein said space for receiving said window pane has a depth which varies as a function of length along said first and second shaped parts, said depth being sized to accommodate movement of said window pane between said open and said closed positions.

4. A sealing strip according to claim 1, wherein at least one of said first and second shaped parts comprises a base part adapted to be attached to said frame structure, and a side part attached to said base part and extending therefrom substantially parallel to said window pane.

5. A sealing strip according to claim 4, wherein said base part extends substantially parallel to an edge portion of said frame structure, said base part being adjustably connectable to said edge portion for adjustment in said direction substantially perpendicular to said window pane.

6. A sealing strip according to claim 4, further comprising at least one sealing profile mounted on one of said shaped parts and positioned between said one shaped part and said frame structure for sealing said space for receiving said window pane.

7. A sealing strip according to claim 1, wherein said shaped parts are made of a plastic material said sealing lip is made of an elastomer.

8. A sealing strip according to claim 1, wherein at least one of said shaped parts is made of metal and said sealing profile is made of an elastomer.

9. A sealing strip according to claim 1, wherein said shaped parts are releasably connected to said frame structure.

10. A sealing strip according to claim 1, wherein said shaped parts are curved so as to accommodate said frame structure.

11. A sealing strip according to claim 2, wherein said space for receiving said window pane has a depth which varies as a function of length along said first and second shaped parts, said depth being sized to accommodate movement of said window pane between said open and said closed positions.

12. A sealing strip according to claim 2, wherein at least one of said first and second shaped parts comprises a base part adapted to be attached to said frame structure, and a side part attached to said base part and extending therefrom substantially parallel to said window pane.

13. A sealing strip according to claim 3, wherein at least one of said first and second shaped parts comprises a base part adapted to be attached to said frame structure, and a side part attached to said base part and extending therefrom substantially parallel to said window pane.

14. A sealing strip according to claim 5, further comprising at least one sealing profile mounted on one of said shaped parts and positioned between said one shaped part and said frame structure for sealing said space for receiving said window pane.

15. A sealing strip according to claim 3, wherein said shaped parts are made of a plastic material and said sealing lip is made of an elastomer.

16. A sealing strip according to claim 4, wherein said shaped parts are made of a plastic material and said sealing lip is made of an elastomer.

17. A sealing strip according to claim 6, wherein said shaped parts are made of a plastic material and said sealing profile and said sealing lip is made of an elastomer.

18. A sealing strip according to claim 5, wherein said shaped parts are releasably connected to said frame structure.

19. A sealing strip according to claim 6, wherein said shaped parts are releasably connected to said frame structure.

20. A sealing strip according to claim 2 wherein said shaped parts are curved so as to accommodate said frame structure.

21. A sealing strip according to claim 3 wherein said shaped parts are curved so as to accommodate said frame structure.

22. A sealing strip according to claim 4 wherein said shaped parts are curved so as to accommodate said frame structure.

23. A sealing strip according to claim 6 wherein said shaped parts are curved so as to accommodate said frame structure.

24. A sealing strip according to claim 3, wherein at least one of said shaped parts is made of metal and said sealing lip is made of an elastomer.

25. A sealing strip according to claim 4, wherein at least one of said shaped parts is made of metal and said sealing lip is made of an elastomer.

* * * * *

UNITED STATES PATENT AND TRADEMARK OFFICE
CERTIFICATE OF CORRECTION

PATENT NO. : 7,434,867 B2  
APPLICATION NO. : 10/541170  
DATED : October 14, 2008  
INVENTOR(S) : Ingolf Matthies Page 1 of 1

It is certified that error appears in the above-identified patent and that said Letters Patent is hereby corrected as shown below:

Title page, the following items should read as follows:

(73)   Assignee: Meteor Gummiwerke K.H. Badje GmbH & Co. KG

(30)   Foreign Application Priority Data  
       Mar. 18, 2003        (DE)        …………….. 203 04 269.7

Signed and Sealed this

Sixth Day of January, 2009

JON W. DUDAS  
*Director of the United States Patent and Trademark Office*